Nov. 14, 1961 A. J. STEINTHAL 3,008,675
PILOT CHUTE
Filed Jan. 13, 1960 3 Sheets-Sheet 3
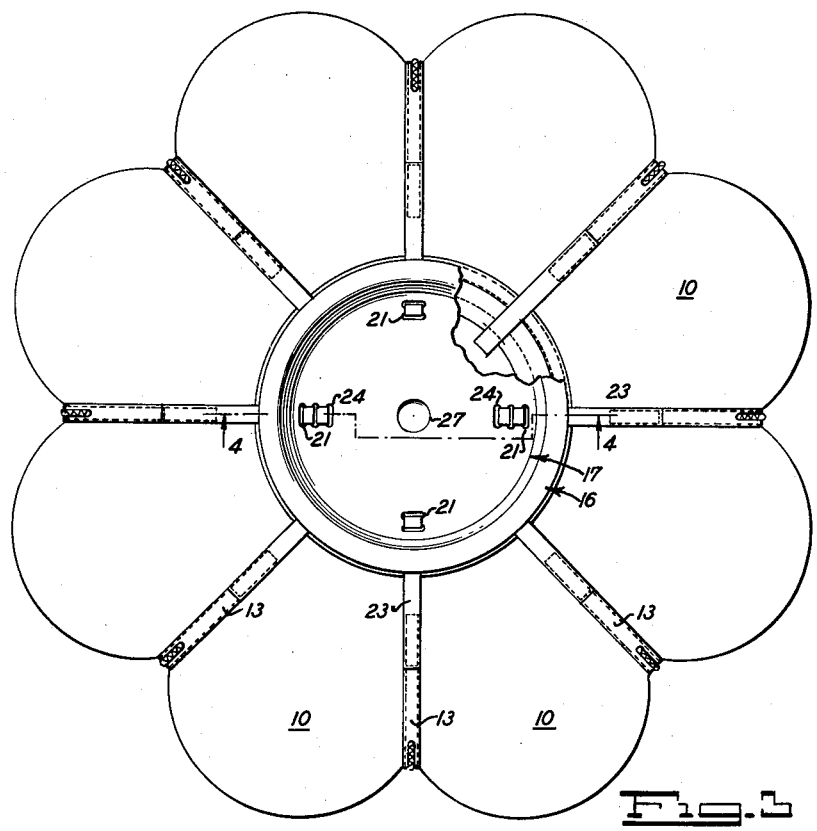
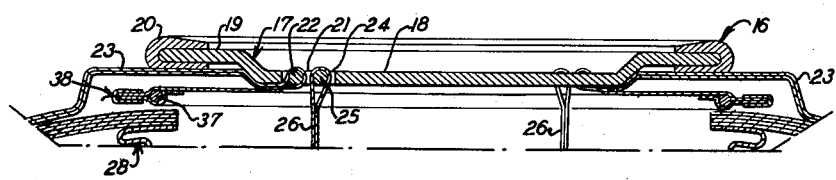
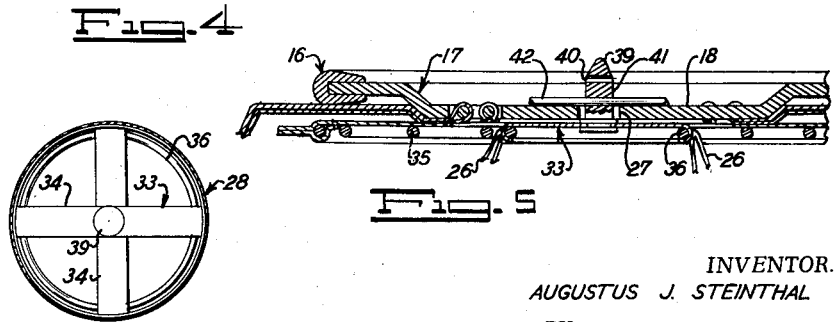
INVENTOR.
AUGUSTUS J. STEINTHAL
BY
Jacobi & Jacobi
ATTORNEYS United States Patent Office 3,008,675
Patented Nov. 14, 1961

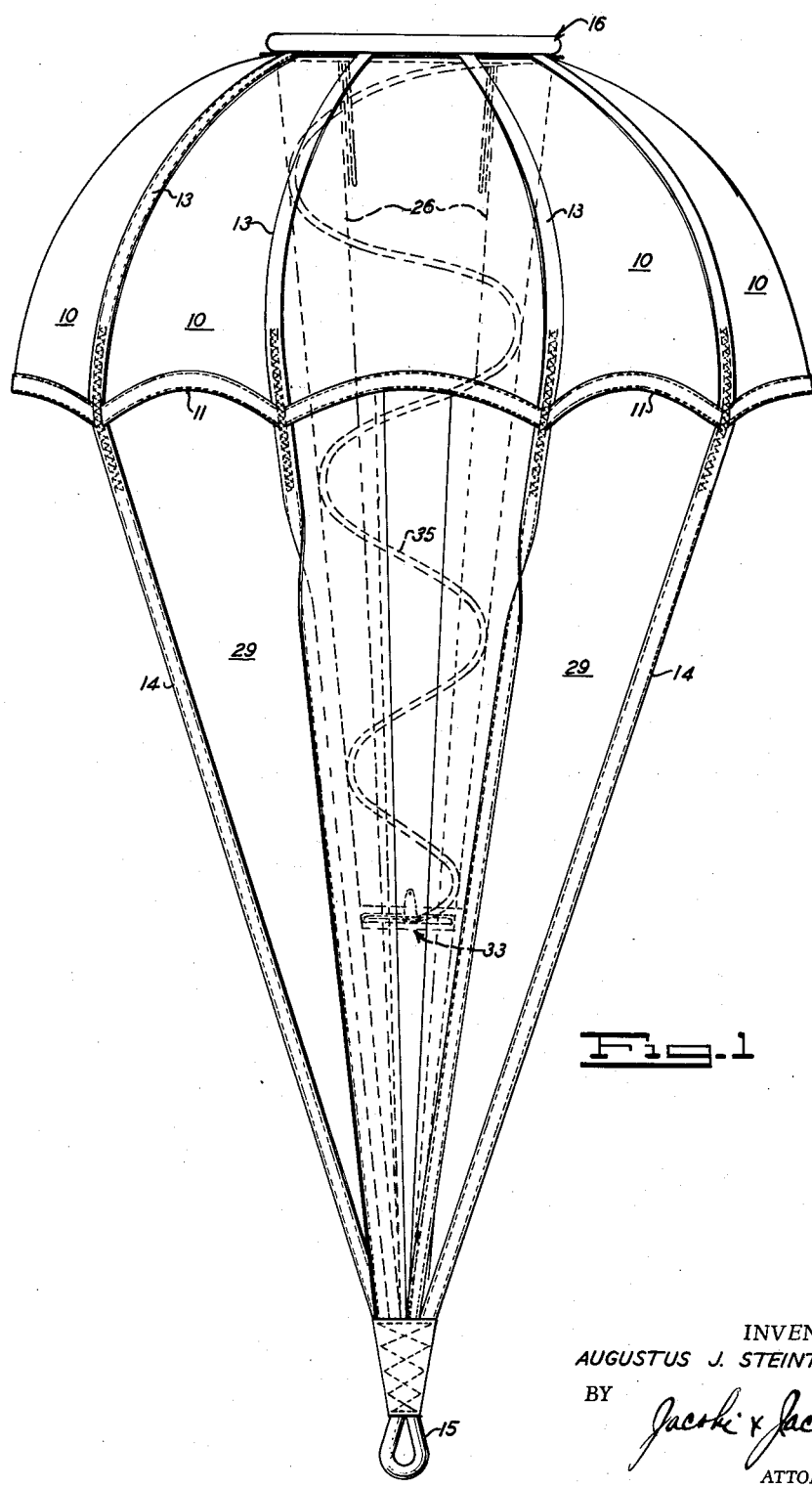

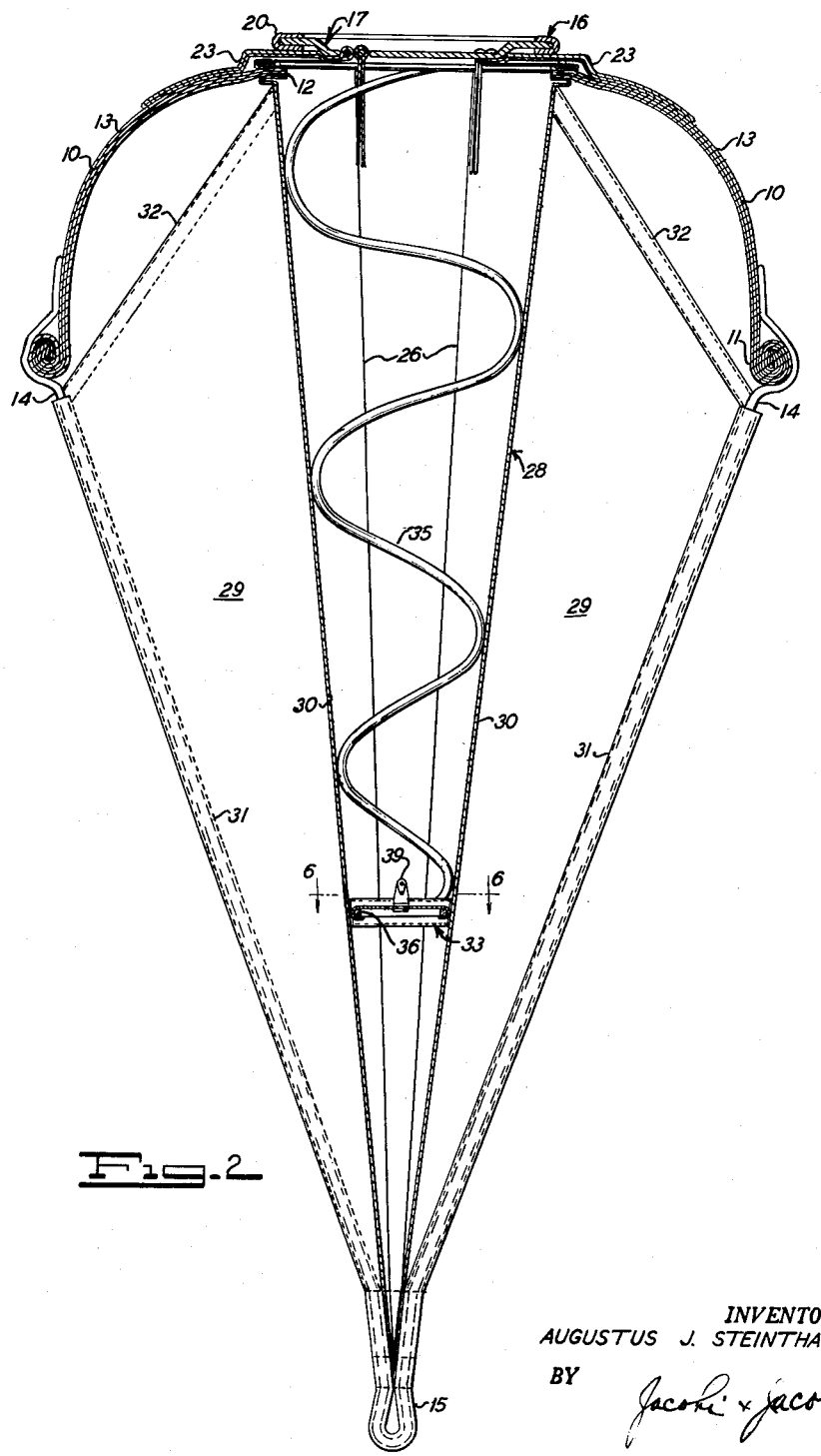

3,008,675
PILOT CHUTE
Augustus John Steinthal, New York, N.Y., assignor to M. Steinthal & Co., Inc., New York, N.Y., a corporation of New York
Filed Jan. 13, 1960, Ser. No. 2,139
4 Claims. (Cl. 244—149)

This invention relates to aeronautics and more particularly to a pilot chute primarily designed for use with a drag chute system, including a deployment bag provided with a compartment for reciving the main parachute and with a smaller compartment for receiving the drag chute.

Parachutes are now very commonly employed as braking means for high speed jet aircraft during landing runs and for this purpose there is commonly provided a drag chute system, including a large main parachute the risers of which are connected to the aircraft, together with a deployment bag providing a compartment for receiving the main parachute in folded condition and the deployment bag also commonly provides a relatively smaller compartment for receiving a pilot chute and the entire assembly contained within the deployment bag is stowed in a compartment in the aircraft. When it is desired to utilize the drag chute system during a landing run of the aircraft, the compartment in the aircraft is opened and at the same time the compartment in the deployment bag containing the pilot chute is opened and the pilot chute is ejected therefrom into the slip stream of the aircraft, the pilot chute serving to pull the deployment bag out of the compartment in the aircraft and to also pull the main parachute out of the compartment in the deployment bag. Thereafter, the main parachute provides a braking force to materially reduce the landing run of the aircraft and as is indicated above, the sole purpose of the pilot chute is to pull the deployment bag from the compartment in the aircraft and to pull the main parachute from the compartment in the deployment bag.

Various types of ejection means have been utilized to eject the pilot chute in the shortest possible time and among these have been ejection springs, explosive ejection devices, as well as other types of pressure operated ejection mechanisms and while all of these mechanisms may satisfactorily perform the ejecting function, it has been found that where an ejecting device consisting of a compression spring has been utilized, some difficulty and inconvenience has arisen in stowing or packing the pilot chute in the compartment in the deployment bag. The compartment in the deployment bag for receiving the pilot chute is relatively small and is commonly closed by four fabric flaps which overlap at the center, three of these flaps being provided with grommets or eyelets through which a cone or stud attached to the fourth flap projects. The cone or stud is normally provided with a transverse aperture for receiving a retaining pin which operates to releasably retain the flaps in closed position over the folded pilot chute. In packing a pilot chute having an ejection spring therein, it is necessary to compress such spring and fold the chute and while holding the spring compressed, pack the chute in the compartment of the deployment bag and fold the flaps thereover until the retaining pin can be placed through the aperture in the stud or cone to retain the flaps in folded condition and thereby retain the pilot chute with the compressed spring in the pilot chute compartment. Obviously, this operation is rendered somewhat difficult by the tendency of the compression spring to expand and consequently, it is a primary object of this invention to provide a pilot chute incorporating a compression ejection spring in which means is provided to retain the spring in compressed condition while packing the chute in the compartment of the deployment bag and folding the flaps to close the compartment.

A further object of the invention is the provision of a pilot chute incorporating a compression ejection spring and in which the stud or cone for retaining the flaps of the pilot chute compartment closed is incorporated as a part of the pilot chute and serves to initially hold the compression spring in compressed condition during packing of the pilot chute and folding of the closure flaps. The spring being released for operation after securing of the closure flaps in place.

A still further object of the invention is the provision of a pilot chute incorporating a compression ejection spring and also incorporating a weight assembly located at the apex of the canopy of the pilot chute to provide inertia for facilitating ejection and deployment of the pilot chute.

Another object of the invention is the provision of a pilot chute, including a compression ejection spring and also including a weight assembly disposed at the apex of the parachute canopy, such weight assembly including a metallic plate secured to the canopy and including means for receiving a retaining stud for retaining the spring in collapsed condition to facilitate packing of the pilot chute in a compartment of a deployment bag.

A further object of the invention is the provision of a pilot chute incorporating a compression ejection spring, together with a weight assembly secured to the parachute canopy at the apex thereof, the canopy being provided with shroud lines attached to the skirt thereof, such shroud lines terminating in bridle attachment means and in which there are also provided tension lines secured to the weight assembly and to the attachment means to absorb shock resulting from expansion of the ejection spring thereby preventing the application of such shock to the fabric of the parachute structure to eliminate any likelihood of damage arising from such shock load.

A still further object of the invention is the provision of a pilot chute incorporating a compression spring for ejecting the chute from the container of a deployment bag and in which such spring is enclosed in fabric cone extending from the apex of the parachute canopy to the bridle attachment means which is also attached to the canopy by shroud lines extending from the attachment means to the skirt of the canopy, the cone serving to protect the parachute structure from wear or damage due to contact with the ejection spring.

Another object of the invention is the provision of a pilot chute incorporating a compression ejection spring in which such spring is enclosed in a fabric cone extending from the apex of the parachute canopy to a bridle attachment means which in turn is secured to the skirt of the parachute canopy by shroud lines, there being stabilizing vanes formed of fabric or other suitable material and radially extending from the surface of the fabric cone to the shroud line, the upper edges of the vanes being spaced from the parachute canopy when such canopy is inflated.

A further object of the invention is the provision of a pilot chute incorporating a compression ejection spring and in which such spring is enclosed in a fabric cone extending from the apex of the parachute canopy to a bridle attachment means which attachment means is also connected to the skirt of the parachute canopy by shroud lines there being an abutment secured within the fabric cone to which one end of the ejection spring is attached, the opposite end of the ejection spring being attached to a weight assembly secured to the parachute canopy at the apex thereof.

Further objects and advantages of the invention will be apparent from the following description taken in conjunction with the accompanying drawings wherein:

FIG. 1 is a view in elevation showing a pilot chute constructed in accordance with this invention;

FIG. 2 a diagrammatic view similar to FIG. 1, but with parts broken away to show the internal structure, including the disposition of the ejecting spring;

FIG. 3 a top plan view of the pilot chute of this invention in inflated condition;

FIG. 4 a sectional view taken substantially on the line 4—4 of FIG. 3 and showing the structure of the weight assembly secured to the canopy of the parachute;

FIG. 5 a fragmentary sectional view similar to FIG. 4, but showing the disposition of the ejecting spring when in compressed condition; and FIG. 6 a sectional view taken substantially on the line 6—6 of FIG. 2.

With continued reference to the drawing, there is shown a pilot chute constructed in accordance with this invention and which may well comprise a canopy formed of a plurality of fabric panels 10 secured together in a conventional manner, the panels terminating at the outer edge in a skirt 11 and having a central opening providing an inner edge 12. The panels 10 may be provided with the usual reinforcing tapes 13 secured along the seams between the panels and as clearly shown in FIGS. 1 and 2 of the drawing, the tapes 13 extend from the inner edge 12 to the skirt 11. Shroud lines 14 are secured to the skirt 11 of the canopy adjacent the termination of each reinforcing tape 13 and the shroud lines 14 terminate at the opposite ends in a bridle attachment means 15.

As best shown in FIGS. 2, 3 and 4, there may be provided a weight assembly 16 which may well comprise a circular metallic plate 17 having a depressed central portion 18 which serves to provide a marginal flange 19. A protective sheath 20 of rubber, fabric, plastic or any other suitable material may enclose the edge of the marginal flange 19. A plurality of angularly spaced slots 21 are provided in the depressed portion 18 of the metallic plate 17 and a cross bar 22 extends across each of the slots 21. Secured to each of the cross bars 22 is a fabric tape 23 which extends outwardly of the weight assembly 16 as clearly shown in FIGS. 2 and 4, and the tapes 23 are attached to certain of the reinforcing tapes 13 of the canopy in order to secure the weight assembly 16 in place at the apex of the canopy to close the opening provided by the inner edge 12. Additional slots 24 are provided in the depressed portion 18 of the metallic plate 17 and extending across each of these slots 24 is a cross bar 25. Attached to each cross bar 25 is one end of a tension line 26 and such tension line extends downwardly as clearly shown in FIG. 2 with the opposite ends thereof being secured to the bridle attachment means 15. The purpose of the tension line 26 will be later described. The depressed portion 18 of the metallic plate 17 is also provided with a central aperture 27, the purpose of which will be later described.

A fabric cone 28 is secured at the larger end to the canopy at the inner edge 12 and the smaller end of the fabric cone 28 is secured to the attachment means 15. A plurality of radially disposed generally triangular fabric stabilizing vanes 29 are secured along their inner edges 30 to the fabric cone 28 and along the outer edges 31 to the shroud lines 14. As clearly shown in FIG. 2, the upper edges 32 of the vanes 29 are spaced from the panels 10 of the canopy when the canopy is in inflated condition.

An abutment 33 in the form of crossed fabric strips 34 is fixed in the cone 28 in spaced relation to the bridle attachment means 15 and while the abutment means 33 is shown in the form of crossed fabric strips 34, it is to be understood that this abutment means may also comprise a solid plate or a solid fabric sheet or may take any other desired form suitable for the purpose intended.

A compression ejection spring 35 is disposed in the cone 28 and the spring 35 terminates at the lower end in a ring 36 which is secured to the abutment 33 and the opposite end of the spring 35 terminates in a ring 37 which may be enclosed by a fabric sheath 38 which, as shown in FIGS. 2 and 4, may be attached to the tapes 23 thereby securing the spring 35 to the weight assembly 16 and the canopy of the parachute. Stud 39 is fixed to the abutment 33 in alignment with the aperture 27 in the metallic plate 17 of the weight assembly 16 and the stud 39 is provided with a pair of vertically spaced transverse apertures 40 and 41, the purpose of which will presently appear.

When it is desired to pack the pilot chute of this invention in the pilot chute compartment of a deployment bag, it is only necessary to compress the spring 35 until the stud 39 on the abutment 33 projects through the aperture 27 in the metallic plate 17 of the weight assembly 16, at which time the convolutions of the spring 35 will be disposed substantially as shown in FIG. 5 adjacent the lower surface of the weight assembly 16. At this time, a retaining pin 42 may be inserted through the lower aperture 41 in the stud 39 and as clearly shown in FIG. 5, the retaining pin 41 will engage the upper surface of the depressed portion 18 of the metallic plate 17, thereby securely holding the spring 35 in compressed condition and permitting convenient packing of the pilot chute in the pilot chute compartment of a deployment bag. When a packing operation has been completed the flaps which serve to close the pilot chute compartment of the deployment bag may be folded over with the grommets or eyelets in such flaps receiving the stud 39 and at this time, a suitable retaining pin, not shown, may be inserted through the upper transverse aperture 40 in the stud 39 which will serve to releasably hold the flaps of the pilot chute compartment of the deployment bag in closed position. Upon completion of this operation, the retaining pin 42 may be withdrawn which will serve to release the spring 35 for operation which will result, upon withdrawal of the retaining pin from the transverse aperture which would serve to permit the flaps to fly open, thereby permitting the spring 35 to eject the pilot chute from the pilot chute compartment of the deployment bag. The weight assembly 16 provides sufficient inertia to facilitate this operation and since the sudden expansion of the ejecting spring 35 might tend to impart considerable shock stress to the fabric cone 28, the tension line 26 previously described and which extend between the weight assembly 16 and the bridle attachment means 15 are of such a length as to absorb the shock load imparted by expansion of the ejecting spring 35 thereby preventing rupture or damage to the fabric cone 28. The fabric cone 28, furthermore serves to protect the various parts of the pilot chute against abrasion or damage by contact with the ejecting spring 35 and also the cone 28 serves as a convenient means for attaching the inner edges of the vanes 29 as fully described above.

While the weight assembly 16 has been shown as essentially comprising a solid metallic plate, it is to be understood that this is for purposes of illustration and that if desired, this solid plate may be replaced by a metallic ring of sufficient mass to provide the desired inertia and the entire ring covered by a fabric covering extending across the opening therein and provided with a grommet or eyelet for receiving the stud 39.

It will be seen that by the above described invention there has been provided a pilot chute which may be conveniently packed in the pilot chute compartment of a deployment bag in that the ejection spring incorporated in the pilot chute may be compressed and releasably held in such compressed condition until completion of the packing operation without danger of the spring being prematurely released which would result in the necessity of repeating the packing operation. Furthermore, the pilot chute of this invention incorporates a novel weight assembly at the apex of the canopy which provides sufficient inertia to facilitate satisfactory ejection of the pilot chute compartment of a deployment bag and furthermore, means has been provided to prevent damage to the pilot chute by reason of the shock imposed upon sudden release and expansion of the ejecting spring.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A pilot chute comprising a canopy formed of fabric panels terminating at the outer edge in a skirt and having a central opening providing an inner edge, shroud lines affixed to said skirt and terminating in bridle attachment means, a weight assembly affixed to said inner edge and closing said opening, said weight assembly comprising a circular metallic plate having a depressed central portion providing a marginal flange, a protective sheath enclosing the edge of said marginal flange, said depressed plate portion having a plurality of angularly spaced slots, and cross bars extending across said slots, fabric tapes connected to said cross bars and to said canopy to secure said weight assembly to said canopy and to close said central opening, a fabric cone secured at the larger end to said inner edge and at the smaller end to said attachment means, a plurality of radially disposed generally triangular fabric vanes secured along the inner edges to said cone and along the outer edges to said shroud lines, the upper edges of said vanes being spaced from said canopy when inflated, an abutment fixed in said cone in spaced relation to said attachment means, a compression spring disposed in said cone, one end of said spring being secured to said abutment and the opposite end secured to said weight assembly, a tapered upstanding stud affixed to said abutment, said stud having a pair of spaced transverse apertures for selectively receiving a retaining pin to hold said spring in collapsed condition and to retain the folded flaps of a deployment bag, and a plurality of tension lines disposed within said cone and secured at one end to said attachment means, said depressed portion having additional slots, said weight assembly including additional cross bars in said additional slots for receiving the other ends of said tension lines for attachment thereto, said depressed portion having a central aperture for receiving said stud.

2. A pilot chute comprising a canopy formed of fabric panels terminating at the outer edge in a skirt and having a central opening providing an inner edge, shroud lines affixed to said skirt and terminating in bridle attachment means, a weight assembly affixed to said inner edge and closing said opening, said weight assembly comprising a circular metallic plate having a depressed central portion providing a marginal flange, a protective sheath enclosing the edge of said marginal flange, said depressed plate portion having a plurality of angularly spaced slots, and cross bars extending across said slots, fabric tapes connected to said cross bars and to said canopy to secure said weight assembly to said canopy and to close said central opening, a fabric cone secured at the larger end to said inner edge and at the smaller end to said attachment means, a plurality of radially disposed generally triangular fabric vanes secured along the inner edges to said cone and along the outer edges to said shroud lines, the upper edges of said vanes being spaced from said canopy when inflated, an abutment fixed in said cone in spaced relation to said attachment means, a compression spring disposed in said cone, one end of said spring being secured to said abutment and the opposite end secured to said weight assembly, a tapered upstanding stud affixed to said abutment, said stud having a pair of spaced transverse apertures for selectively receiving a retaining pin to hold said spring in collapsed condition and to retain the folded flaps of a deployment bag, a plurality of tension lines disposed within said cone and secured at one end to said attachment means, said depressed portion having additional slots, and means in said depressed portion of the plate for receiving said tension lines for attachment thereto, said depressed portion having a central aperture for receiving said stud.

3. A pilot chute comprising a canopy formed of fabric panels terminating at the outer edge in a skirt and having a central opening at the apex, shroud lines affixed to said skirt and terminating in bridle attachment means, a weight assembly affixed to said canopy at the apex and comprising a metallic plate closing said opening and having a depressed central portion providing a marginal flange, said depressed portion having a plurality of angularly spaced slots, and cross bars extending across said slots, fabric tapes connected to said cross bars and to said canopy to secure said weight assembly to said canopy, a fabric tubular member secured at one end to said canopy at the apex and extending towards said attachment means, an abutment fixed in said tubular member in spaced relation to said attachment means, a compression spring disposed in said tubular member, one end of said spring being secured to said abutment and the opposite end secured to said weight assembly, and an upstanding stud affixed to said abutment, said depressed portion of the plate having a central aperture for receiving said stud, said stud having a transverse aperture for receiving a retaining pin to hold said spring in collapsed condition.

4. A pilot chute comprising a canopy formed of fabric panels terminating at the outer edge in a skirt and having a central opening providing an inner edge, shroud lines affixed to said skirt and terminating in bridle attachment means, a weight assembly affixed to said inner edge and closing said opening, said weight assembly comprising a metallic plate having a depressed central portion providing a marginal flange, said depressed portion having a plurality of angularly spaced slots and cross bars extending across said slots, fabric tapes connected to said cross bars and to said canopy to secure said weight assembly to said canopy and to close said central opening, a compression spring extending from said weight assembly towards said attachment means and having one end secured to said weight assembly, an abutment secured to the other end of said spring, a tapered upstanding stud affixed to said abutment, said stud having a pair of spaced transverse apertures for selectively receiving a retaining pin to hold said spring in collapsed condition and to retain the folded flaps of a deployment bag, a plurality of tension lines secured at one end to said attachment means, and means in said depressed portion for receiving the opposite ends of said tension lines, said depressed portion having an aperture for receiving said stud.

References Cited in the file of this patent

UNITED STATES PATENTS

| | | |
|---|---|---|
| 1,081,137 | Von Augezd | Dec. 9, 1913 |
| 2,299,408 | Quilter | Oct. 20, 1942 |
| 2,517,417 | Quilter | Aug. 1, 1950 |
| 2,673,051 | Frost | Mar. 23, 1954 |
| 2,718,369 | MacMillan | Sept. 20, 1955 |
| 2,967,685 | Magnuson | Jan. 10, 1961 |

FOREIGN PATENTS

| | | |
|---|---|---|
| 722,442 | Great Britain | Jan. 26, 1955 |